UNITED STATES PATENT OFFICE.

EUGEN ANDERWERT, HERMANN FRITZSCHE, AND HEINRICH SCHOBEL, OF BASEL, SWITZERLAND, ASSIGNORS TO SOCIETY OF CHEMICAL INDUSTRY IN BASLE, OF BASEL, SWITZERLAND.

COPPER COMPOUND OF SUBSTANTIVE ORTHOOXYAZO DYESTUFF AND PROCESS OF MAKING SAME.

1,292,385.     Specification of Letters Patent.     Patented Jan. 21, 1919.

No Drawing.     Application filed November 4, 1915, Serial No. 59,580.

*To all whom it may concern:*

Be it known that we, EUGEN ANDERWERT, a citizen of the Swiss Republic, HERMANN FRITZSCHE, a citizen of the Swiss Republic, and HEINRICH SCHOBEL, a citizen of the Swiss Republic, all three residents of Basel, Switzerland, have invented new Copper Compounds of Substantive Orthooxyazo Dyestuffs and Processes of Making Same, of which the following is a full, clear, and exact specification.

We have found that the substantive cotton orthooxyazodyestuffs and especially those able to be prepared according to the five applications for U. S. Letters Patent Ser. No. 54403, filed October 6, 1915, Ser. No. 144244, filed January 24, 1917, (divisional application of Ser. No. 54403), Ser. No. 144243, filed January 24, 1917 (divisional application of Ser. No. 54403), Ser. No. 54513, filed October 7, 1915, Ser. No. 164795, filed April 26, 1917 (divisional application of Ser. No. 54513) and on the U. S. Letters Patent No. 1210751, dated January 2, 1917, can be converted into well defined copper compounds, soluble in water and from which the copper cannot be precipitated by sodium carbonate, soda lye and ammonia. The said copper compounds dye like the other substantive dyestuffs from their aqueous solutions, yielding various tints of hitherto for substantive cotton dyestuffs unknown fastness. The fastness to washing and particularly the fastness to alkali and acid are essentially improved against those of the parent dyestuffs. Furthermore the fastness to light is raised in such a manner that some representatives of the new dyestuff class possess a fastness to light, which could only be obtained with the best vat dyestuffs. The preparation of the new copper compounds is obtained by acting with copper compounds (copper salts, copper oxids or copper hydroxids) on aqueous solutions or suspensions of the orthooxyazodyestuffs able to be prepared according to the said five applications for U. S. Letters Patent and the said Letters Patent 1210751. The reaction is generally accompanied by a change of coloration and the new copper compounds separate generally by themselves. If this precipitation occurs not by itself, the dyestuffs can be salted out. The presence of an excess of copper is ascertained by a test with potassium ferrocyanid before the copper compound is isolated by filtration, washed and dried.

The invention is illustrated by the following examples:

Example 1: The monoazodyestuff derived from 15.4 kg. 4:2:1-nitrodiazophenol and 37 kg. m-aminobenzoyl-2:5:7-aminonaphtholsulfonic acid is after filtration mixed throughout with about 1000 liters water of about 50° C. and acidulated with hydrochloric acid till the mass shows with kongo a weakly acid reaction and hereafter a solution of 20 kg. copper sulfate is added to the said mass; the separation of the copper compound in form of a thick paste begins immediately, the coloration turning to violet. The mass is then heated to 80–90° C., stirred for some time, the dyestuff passing in course of this stirring to a crystalline form, and the presence of an excess of copper sulfate is ascertained by adding a solution of potassium ferrocyanid to a small quantity of the liquid part of the mass. If such an excess be not ascertained, a further quantity of copper sulfate should be added. The reaction mass, which shows now a strongly acid reaction with kongo, is neutralized with a solution of sodium carbonate, till the same shows a weakly acid reaction. The mass is then filtered, pressed and dried.

The dyestuff constitutes a powder of bronze luster, which dissolves in water with blue-red coloration. From this aqueous solution it dyes cotton, wool, silk, etc., according to the dyeing method usually employed for substantive dyestuffs, pure bluish roseate tints, which are considerably purer than those obtained with the orthooxyazodyestuff employed as parent material and are distinguished from this latter by a much better fastness to light and alkali. Diazotized on the fiber and developed with beta-napthol the shade becomes more yellowish and its fastness to washing becomes improved.

Example 2: The monoazodyestuff derived from orthodiazophenolsulfonic acid and

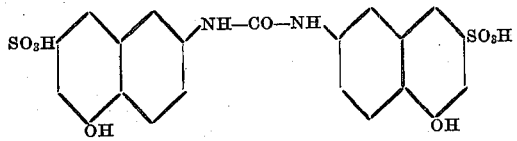

is dissolved in 1000 liters water at 50° C. The solution is acidulated with hydrochloric acid and a solution of 40 kg. copper sulfate in water is added to the solution. The process is continued as in Example 1. The copper compound is partly dissolved and is entirely precipitated by addition of common salt. It yields on cotton pure reddish-Bordeaux tints fast to alkali and of excellent fastness to light. In all respects its fastness is considerably better than that of the dyestuff used as parent material.

In an analogous manner can be prepared the copper compounds of the various other substantive orthooxyazodyestuffs able to be prepared according to the five above referred United States Patent applications and the U. S. Letters Patent No. 1210751 and instead of the copper sulfate employed in the example can be employed with the same success other copper salts, copper oxid, copper hydroxid or metallic copper.

The preparation of the said copper compounds can further be effected by preparing the substantive orthooxyazodyestuffs according to the five above referred U. S. patent applications and the U. S. Letters Patent No. 1210751 in presence of copper, copper salts, copper oxid or copper hydroxid, so that the copper compounds of the substantive orthooxyazodyestuffs are formed directly and can be isolated by filtration, eventually after an addition of common salt, washed and dried.

Example 3: To an aqueous solution of 37 kg. metaamidobenzoyl-2:5:7-aminonaphtholsulfonic acid and of 40 kg. sodium carbonate is added a solution of 20 kg. crystallized copper sulfate, the copper being thus precipitated as copper hydroxid. To the obtained mixture is poured the diazocompound derived from 15.4 kg. 4:2:1-nitroaminophenol. The formation of the copper compound occurs very quickly. The combination being achieved the copper compound is extracted with much water, separated by filtration from the unsolved copper hydroxid and the dyestuff is salted out from the clear solution. The copper compound isolated in the usual manner is identical with that obtained according to Example 1.

In an analogous manner can be prepared copper compounds of the various other substantive orthooxyazodyestuffs able to be prepared according to the five above referred U. S. patent applications and the U. S. Letters Patent No. 1210751, by producing the said orthooxyazodyestuffs in presence of a copper derivative, the copper compounds thus obtained being without exception identical with those obtained by acting with copper derivatives on the achieved dyestuffs derived from the same components.

The following tabular exhibit relates to numerous new copper compounds obtainable according to the invention and shows some of their properties comparatively with those of the parent materials.

| Diazo compound of— | Component. | Reactions of the Na-salt of the resulting dyestuff. | | | Reactions of the copper compound. | | |
|---|---|---|---|---|---|---|---|
| | | Solution in $H_2O$. | Aqueous solution after addition of NaOH. | Dyeing on cotton. | Solution in $H_2O$. | Aqueous solution after addition of NaOH. | Dyeing on cotton. |
| 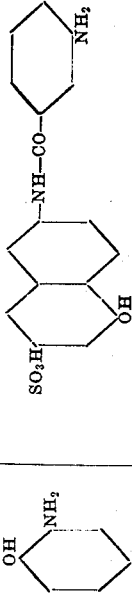 (OH, NH₂ on benzene) | 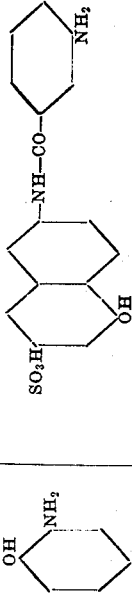 (SO₃H-naphthol–NH–CO–C₆H₄–NH₂) | Bluish red | Reddish brown | Pink | Bluish red | No alteration | Bordeaux. |
|  (OH, NH₂, NO₂ on benzene) | ...do... | Violet | Red | Yellowish pink | Bluish red | No alteration | Bluish pink. |
|  (OH, NH₂, NO₂, CH₃ on benzene) | ...do... | Blue | Bluish-red precipitate | Violet brown | Bluish red | No alteration | Pure violet. |
| 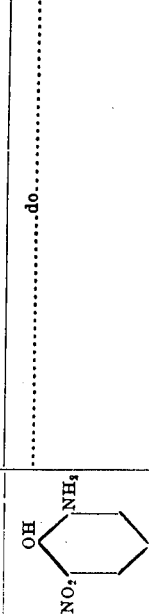 (OH, NH₂, NO₂, CH₃ on benzene) | ...do... | Blue | Reddish brown | Reddish brown | Bluish red | Bluish-red precipitate | Bordeaux. |
| 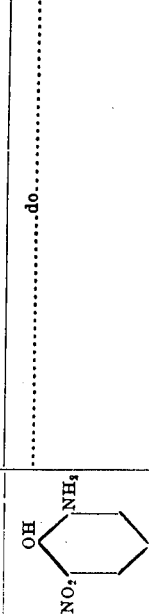 (OH, NH₂, NO₂, Cl on benzene) | ...do... | Blue | Blue precipitate | Blackish blue | Reddish violet | Violet | Reddish violet. |
| 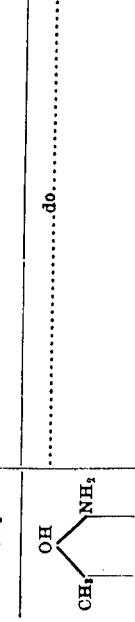 (OH, NH₂, NO₂ on benzene) | ...do... | Blue | Bluish violet | Bluish pink | Blue | Violet | Greenish gray. |

| Diazo compound of— | Component. | Reactions of the Na-salt of the resulting dyestuff. | | | Reactions of the copper compound. | | |
|---|---|---|---|---|---|---|---|
| | | Solution in $H_2O$. | Aqueous solution after addition of NaOH. | Dyeing on cotton. | Solution in $H_2O$. | Aqueous solution after addition of NaOH. | Dyeing on cotton. |
| OH / NH₂ / Cl / NO₂ (structure) | SO₃H—[naphthol]—OH, —NH—CO—[phenyl]—NH₂ | Blue | Violet | Buff violet | Bluish green | Blue precipitate | Greenish gray. |
| OH / NH₂ / NO₂ / NO₂ (structure) | do | Reddish violet | Bluish-black precipitate | Dull lilac | Bluish red | No alteration | Buff bordeaux. |
| NH₂ / NHCOCH₃ (structure) | SO₃H—[naphthol]—OH, —NH—CO—[phenyl]—NH₂ | Reddish brown | No alteration | Buff yellowish red | Bluish red | No alteration | Reddish violet. |
| OH / NH₂ / NO₂ (structure) | SO₃H—[naphthol]—OH, NH—C(=N)—[phenyl]—NH₂ | Violet | Red | Buff reddish blue | Bluish red | Unaltered | Bordeaux. |
| Do | SO₃H—[naphthol]—OH, S—C(=N)—[phenyl]—NH₂ | Violet | Bluish-green precipitate | Buff blue | Bluish red | Unaltered | Bordeaux. |

| Diazo compound of— | Component. | Reactions of the Na-salt of the resulting dyestuff. | | | Reactions of the copper compound. | | |
|---|---|---|---|---|---|---|---|
| | | Solution in H₂O. | Aqueous solution after addition of NaOH. | Dyeing on cotton. | Solution in H₂O. | Aqueous solution after addition of NaOH. | Dyeing on cotton. |
| [structure: OH, NH₂ on benzene] | [structure: SO₃H-naphthol–NH.CO.NH–naphthol-SO₃H, OH 1 mol.] | Yellowish red | Brownish red | Pure red | Reddish violet | Violet | Reddish violet. |
| [structure: OH, NH₂, NO₂ on benzene] | ......do...... 1 mol. | Violet | Brownish red | Heliotrope | Bluish red | Bluish-red precipitate. | Bordeaux. |
| Do. | [structure: SO₃H-naphthol–NH–naphthol-SO₃H, OH 1 mol.] | Red | Brownish red | Violet | Reddish violet | No alteration | Bluish violet. |

| Diazo compound of— | Middle component. | Diazo compound of— | Reactions of the Na-salt of the dyestuff. | | | Reactions of the copper compound. | | |
|---|---|---|---|---|---|---|---|---|
| | | | Solution in H₂O. | Aqueous solution after addition of NaOH. | Dyeing on cotton. | Solution in H₂O. | Aqueous solution after addition of NaOH. | Dyeing on cotton. |
| 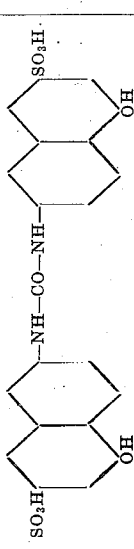 | 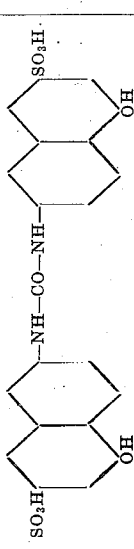 | 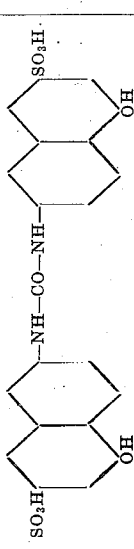 | Red | Violet | Yellowish red | Bluish red | Unaltered | Reddish violet. |
| 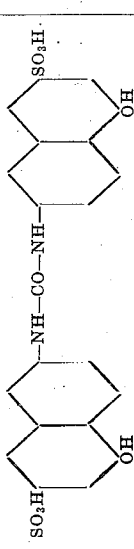 | do | 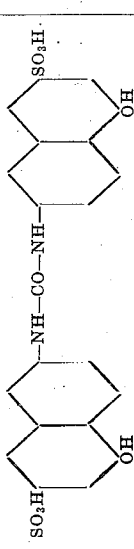 | Cherry red | Bluish red | Dull yellowish pink. | Bluish red | Unaltered | Pure bordeaux. |
| 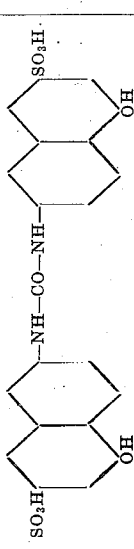 | do | 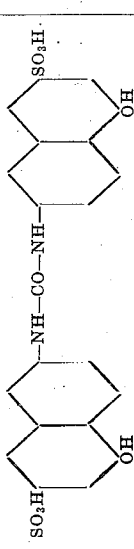 | Blue | Bluish red | Dull bluish red | Bluish red | Bluish red precipitate. | Blue bordeaux. |
| 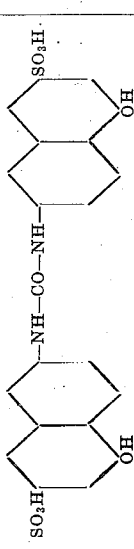 | do | 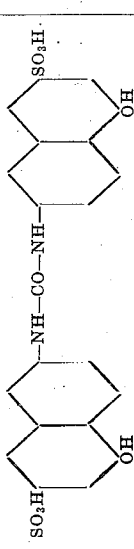 | Blue | Unaltered | Bluish pink | Bluish violet | Blue | Bluish violet. |
| 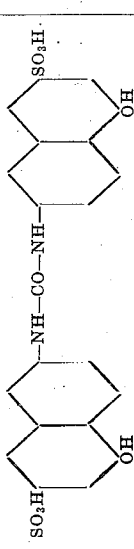 | do | 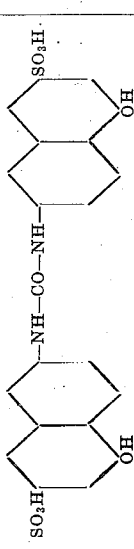 | Red | Violet | Yellowish red | Bluish red | Unaltered | Reddish violet. |
| 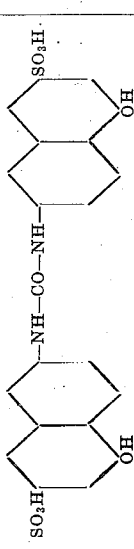 | do | 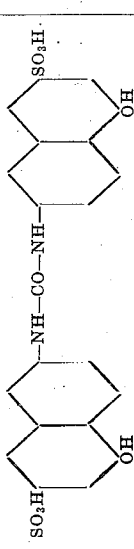 | Blue | Violet precipitate. | Greenish blue | Bluish red | Bluish red precipitate. | Bluish violet. |

| Diazo compound of— | Middle component. | Diazo compound of— | Reactions of the Na-salt of the dyestuff. | | | Reactions of the copper compound. | | |
|---|---|---|---|---|---|---|---|---|
| | | | Solution in H₂O. | Aqueous solution after addition of NaOH. | Dyeing on cotton. | Solution in H₂O. | Aqueous solution after addition of NaOH. | Dyeing on cotton. |
| 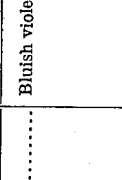 (OH, NH₂, NO₂, Cl) | 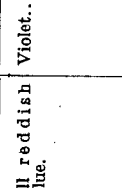 (SO₃H—NH—CO—NH—SO₃H, OH, OH) | 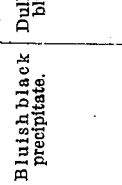 (OH, NH₂, NO₂, Cl) | Blue | Bluish black precipitate. | Dull reddish blue. | Violet | Bluish violet | Bluish violet. |
| 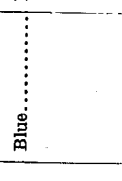 (OH, NH₂, NO₂, NO₂) | do | 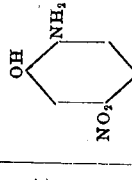 (OH, NH₂, NO₂, NO₂) | Reddish violet | Bluish red precipitate. | Violet brown | Bluish red | Bluish precipitate. | Dull bordeaux. |
| 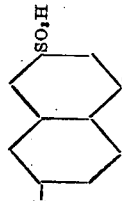 (OH, NH₂, NO₂, CH₃) | do |  (OH, NH₂, NO₂, CH₃) | Blue | Unaltered | Dull greenish blue. | Bluish red | Bluish red precipitate. | Reddish violet. |
| 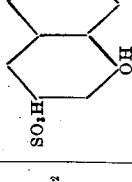 (COOH, OH, NH₂, NO₂) | do | 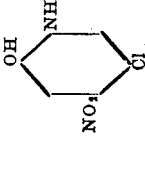 (COOH, OH, NH₂, NO₂) | Red | Bluish red | Dull reddish violet. | Violet | Unaltered | Yellowish bordeaux. |
|  (OH, NH₂, NO₂) | do | 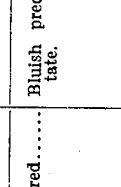 (OH, NH₂, NO₂) | Violet | Bluish red | Dull bordeaux | Bluish red | Unaltered | Bluish red. |
| Do | do | 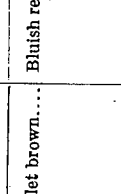 (OCH₃, NH₂) | Red | Bluish red precipitate. | Yellowish red | Red | Bluish red | Bordeaux. |

| Diazo compound of— | Middle component. | ⇐ Diazo compound of— | Reactions of the Na-salt of the dyestuff. | | | Reactions of the copper compound. | | |
|---|---|---|---|---|---|---|---|---|
| | | | Solution in H₂O. | Aqueous solution after addition of NaOH. | Dyeing on cotton. | Solution in H₂O. | Aqueous solution after addition of NaOH. | Dyeing on cotton. |
| 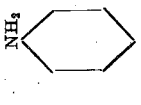 | 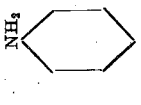 |  | Bluish red...... | Reddish brown. | Dull yellowish red. | Red............ | Unaltered...... | Bluish red. |
|  | 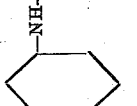 | 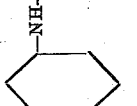 | Violet.......... | Brownish red... | Reddish violet.. | Reddish violet.. | Unaltered...... | Very reddish blue. |
| 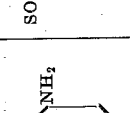 | ......do...... | 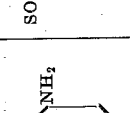 | Reddish violet.. | Reddish blue precipitate. | Blue............ | Violet.......... | Unaltered...... | Reddish blue. |
|  | ......do...... |  | Red............ | Yellowish red... | Bluish red...... | Red............ | Somewhat yellower. | Blue bordeaux. |
|  |  |  | Reddish violet.. | Red............ | Grayish brown.. | Brownish red... | Unaltered...... | Bordeaux. |
|  | ......do...... |  | Orange red..... | Orange......... | Orange......... | Brownish red... | Unaltered...... | Red. |

| Diazo compound of:— | Component to be further diazotized. | Final component. | Reactions of the Na-salt of the dyestuff. | | | Reactions of the copper compound. | | |
|---|---|---|---|---|---|---|---|---|
| | | | Solution in H₂O. | Aqueous solution after addition of NaOH. | Dyeing on cotton. | Solution in H₂O. | Aqueous solution after addition of NaOH. | Dyeing on cotton. |
| OH-NH₂ benzene | SO₃H-naphthol-NH₂ | naphthalene SO₃H / OH / NHCOC₆H₅ | Blue | Violet | Reddish blue | Violet blue | Blue | Greenish blue |
| OH-NH₂-NO₂ benzene | do | naphthalene OH / NH₂ / SO₃H / SO₃H | Blue | Unaltered | Reddish blue | Blue | Unaltered | Greenish blue |
| OH-NH₂-NO₂ benzene | do | naphthalene OH / NH₂ / SO₃H / SO₃H | Blue | Unaltered | Reddish blue | Blue | Unaltered | Greenish blue |
| Do | do | naphthalene SO₃H / NH₂ / OH | Bluish violet | Unaltered | Bluish violet | Blue | Unaltered | Greenish blue |
| OH-NH₂-SO₃H benzene | SO₃H— —NH-CO— —NH₂ / OH naphthalene | OH-COOH benzene | Red | Brownish red | Yellowish red | Red | Unaltered | Yellowish bordeaux |
| OH-NH₂ benzene | do | NH₂-NH₂ / SO₃H benzene | Yellowish brown | Red | Brown | Reddish violet | Reddish brown | Reddish brown |

| Diazo compound of— | Component to be further diazotized. | Final component. | Reactions of the Na-salt of the dyestuff. | | | Reactions of the copper compound. | | |
|---|---|---|---|---|---|---|---|---|
| | | | Solution in $H_2O$. | Aqueous solution after addition of NaOH. | Dyeing on cotton. | Solution in $H_2O$. | Aqueous solution after addition of NaOH. | Dyeing on cotton. |
| $NH_2$, OH benzene | $SO_3H$-naphthol-N=CH-NH-aminonaphthol | OH-naphthol-$SO_3H$ | Red | Brownish red | Yellowish red | Red | Red | Bluish bordeaux. |
| $NH_2$, OH, $NO_2$ benzene | do | do | Bluish red | Red | Buff violet | Bluish red | Unaltered | Reddish violet. |
| $NH_2$, OH, $NO_2$ benzene | do | do | Bluish red | Reddish violet | Buff red | Reddish violet | Unaltered | Heliotrope. |
| $NH_2$, OH, $NO_2$, $CH_3$ benzene | do | do | Bluish violet | Dirty red | Dull violet | Bluish red | Unaltered | Bluish bordeaux. |
| $NH_2$, OH, $SO_3H$ benzene | $NH_2$-naphthalene | $SO_3H$, OH-naphthol-NH-CO-phenyl-$NH_2$ | Bluish violet | Blue | Reddish blue | Violet black | Blue | Blue. |

| Diazo compound of:— | Component to be further diazotized. | Final component. | Reactions of the Na-salt of the dyestuff. | | | Reactions of the copper compound. | | |
|---|---|---|---|---|---|---|---|---|
| | | | Solution in H₂O. | Aqueous solution after addition of NaOH. | Dyeing on cotton. | Solution in H₂O. | Aqueous solution after addition of NaOH. | Dyeing on cotton. |
| OH-NH₂-NO₂ (benzene) | NH₂-naphthalene-SO₂H | SO₃H-naphthalene-OH-NH₂ | Reddish blue. | Blue precipitate. | Reddish blue. | Violet. | Blue. | Blue. |
| Do. | do. | SO₃H-naphthalene-OH-NH-CO-C₆H₄-NH₂ | Blue. | Blue precipitate. | Greenish blue. | Violet black. | Blue precipitate. | Greenish blue. |
| Do. | do. | SO₃H-naphthalene-OH-N=C(-NH-)-C₆H₄-NH₂ | Blue. | Bluish black. | Greenish blue. | Violet black. | Blue. | Greenish blue. |

| Diazo compound of— | Amin further to be diazotized. | Middle component. | Amin further to be diazotized. | Diazo-compound of— | Reactions of the Na-salt of the dyestuff. | | | Reactions of the copper compound. | | |
|---|---|---|---|---|---|---|---|---|---|---|
| | | | | | Solution in H₂O. | Aqueous solution after addition of NaOH. | Dyeing on cotton. | Solution in H₂O. | Aqueous solution after addition of NaOH. | Dyeing on cotton. |
| 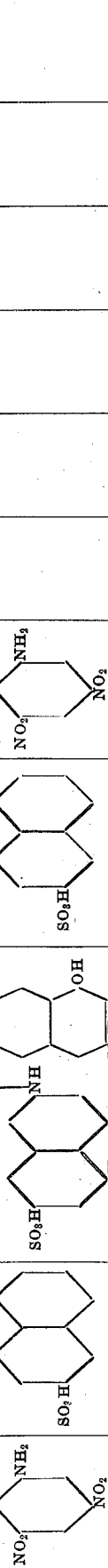 | 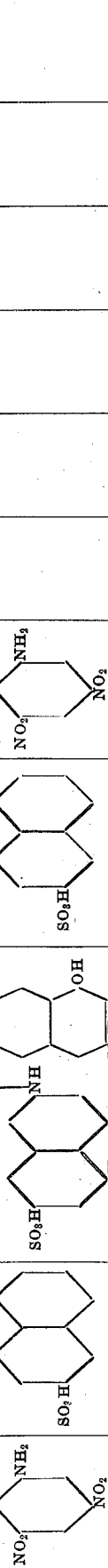 | 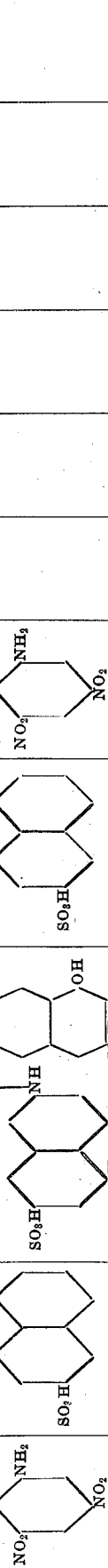 | 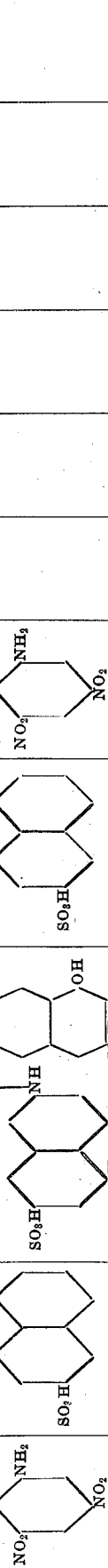 | 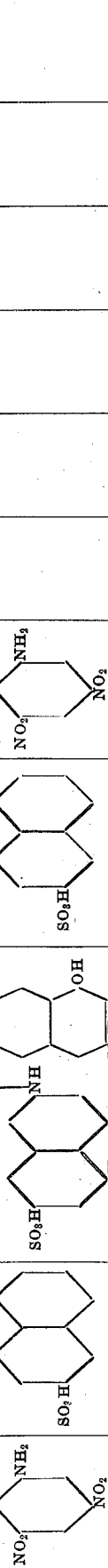 | Blue | Bluish violet | Buff blue | Bluish violet | Unaltered | Blue. |
| 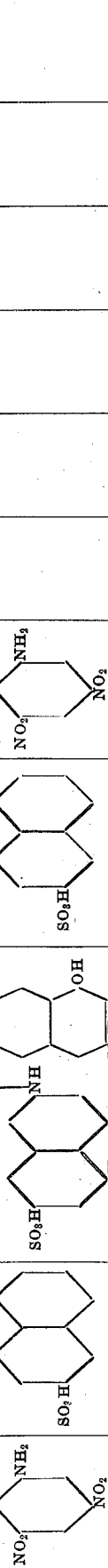 | | do | 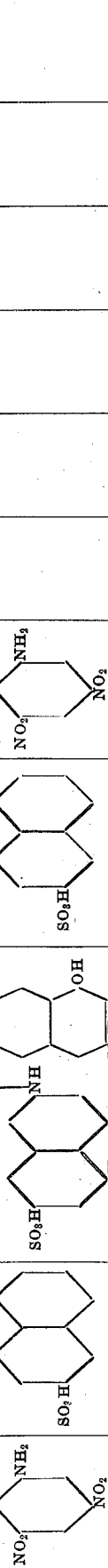 | 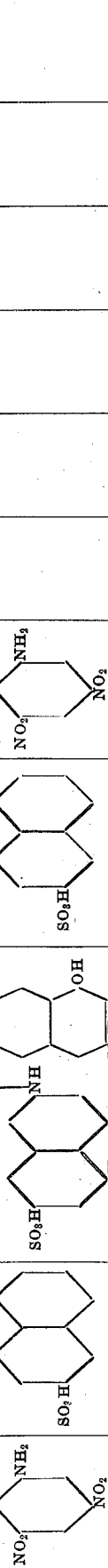 | Red | Reddish blue | Dull yellowish red | Bluish red | Unaltered | Corinth. |
| 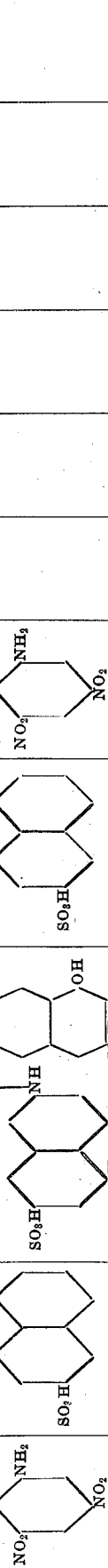 | | do | do | do | Reddish violet | Reddish violet | Dull yellowish red | Red | Bluish red | Bluish red. |
| 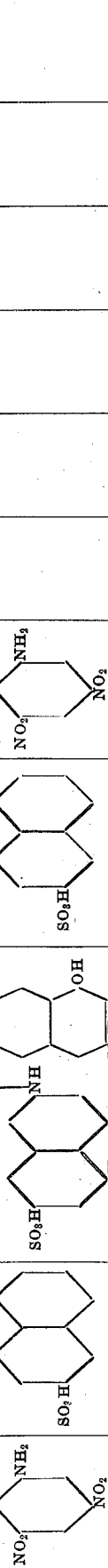 | | 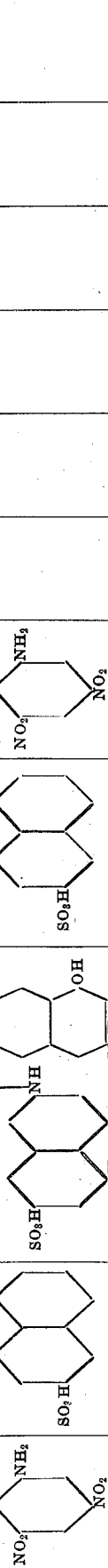 | 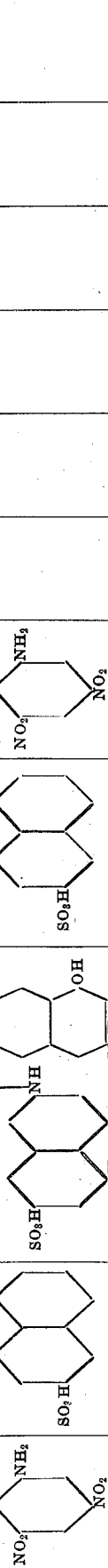 | 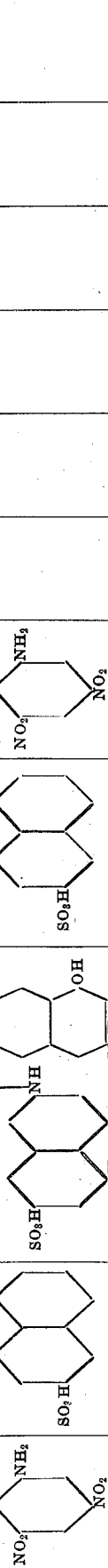 | Blue | Blue precipitate | Blue | Violet black | Blue precipitate | Greenish blue. |
| 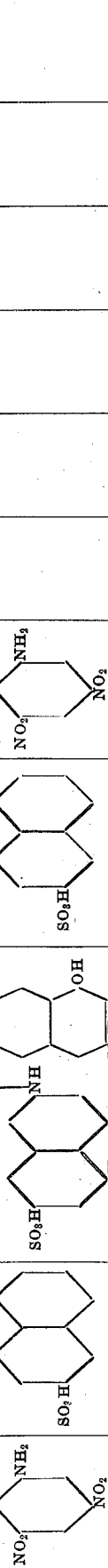 | | do | do | do | Blue | Blue precipitate | Reddish blue | Violet black | Blue precipitate | Buff blue. |

| Diazo compound of— | First middle component to be further diazotized. | Second middle component to be further diazotized. | Final component. | Reactions of the Na-salt of the dyestuff. | | | Reactions of the copper compound. | | |
|---|---|---|---|---|---|---|---|---|---|
| | | | | Solution in $H_2O$. | Aqueous solution after addition of NaOH. | Dyeing on cotton. | Solution in $H_2O$. | Aqueous solution after addition of NaOH. | Dyeing on cotton. |
| OH, $NH_2$, $NO_2$ benzene | $NH_2$, $SO_3H$ naphthalene | $NH_2$, $SO_3H$ naphthalene | $NH_2$, OH, $SO_3H$ naphthalene | Blue | Blue | Greenish blue | Bluish violet | Unaltered | Greenish blue |
| OH, $NH_2$, $SO_3H$ benzene | $NH_2$ naphthalene | ...do... | $NHC_6H_5$, OH, $SO_3H$ naphthalene | Blue | Blue | Greenish blue | Violet blue | Unaltered | Greenish blue |

| Diazo compound of— | Component. | Diazo compound of— | Reactions of the Na-salt of the dyestuff. | | | Reactions of the copper compound. | | |
|---|---|---|---|---|---|---|---|---|
| | | | Solution in H₂O. | Aqueous solution after addition of NaOH. | Dyeing on cotton. | Solution in H₂O. | Aqueous solution after addition of NaOH. | Dyeing on cotton. |
| [OH, NH₂, NO₂ benzene] | [SO₃H-naphthol azo naphthol-SO₃H with OH and NH₂] | [OH, NH₂, NO₂ benzene] | Blue. | Bluish violet. | Reddish blue. | Violet. | Unaltered. | Reddish blue. |
| [OH, NH₂, NO₂, NO₂ benzene] | ......do...... | [OH, NH₂, NO₂, NO₂ benzene] | Violet. | Violet black precipitate. | Greenish blue. | Violet. | Violet precipitate. | Reddish blue. |
| [OH, NH₂, NO₂ benzene] | ......do...... | [OH, NH₂, NO₂ benzene] | Blue. | Blue. | Reddish blue. | Bluish violet. | Unaltered. | Greenish blue. |
| [OH, NH₂ benzene] | [SO₃H-naphthol azo naphthol-SO₃H with OH and NH₂] | [NH₂, SO₃H benzene] | Violet. | Somewhat redder. | Very reddish blue. | Violet. | Bluish violet. | Bluer than Na-salt. |
| [OH, NH₂, NO₂ benzene] | ......do...... | ...do... | Bluish violet. | Bluish violet. | Reddish blue. | Violet. | Unaltered. | Bluer than Na-salt. |

| Diazo compound of— | Component. | Diazo compound of— | Reactions of the Na-salt of the dyestuff. | | | Reactions of the copper compound. | | |
|---|---|---|---|---|---|---|---|---|
| | | | Solution in $H_2O$. | Aqueous solution after addition of NaOH. | Dyeing on cotton. | Solution in $H_2O$. | Aqueous solution after addition of NaOH. | Dyeing on cotton. |
| OH—NH₂—NO₂ (benzene) | SO₃H—OH—naphthalene—N=N—naphthalene—OH—SO₃H | NH₂ (benzene) | Blue | Violet | Reddish blue | Violet | Unaltered | Bluer than Na-salt. |
| OH—NH₂—NO₂ (benzene) | do | NH₂—benzene—NHCOCH₃ | Violet | Somewhat redder | Reddish blue | Violet | Bluish violet | Reddish blue. |
| SO₃H—naphthalene—N=N—benzene—OH—NO₂ | do | SO₃H—naphthalene—NH₂—N=N—benzene—OH—NO₂ | Blue | Bluish black | Greenish blue | Violet | Blue | Greenish blue. |
| OH—NH₂—NO₂ (benzene) | do | do | Blue | Bluish black | Blue | Violet | Bluish violet | Reddish blue. |

| Diazo compound of— | Component. | Diazo compound of— | Reactions of the Na-salt of the dyestuff. | | | Reactions of the copper compound. | | |
|---|---|---|---|---|---|---|---|---|
| | | | Solution in $H_2O$. | Aqueous solution after addition of NaOH. | Dyeing on cotton. | Solution in $H_2O$. | Aqueous solution after addition of NaOH. | Dyeing on cotton. |
| [structure: OH, NH₂ benzene] | [structure: naphthalene with SO₃H, OH, N=N linkage to naphthalene with SO₃H, OH, NH₂] | [structure: naphthalene with NH₂, SO₃H, N=N to benzene with OH, NH₂] | Violet. | Bluish violet. | Reddish blue. | Reddish violet. | Reddish violet. | Reddish blue. |
| [structure: OH, NH₂, SO₃H benzene] | [structure: two naphthalene units linked by NH—CO—NH, with SO₃H and OH] | [structure: OH, NH₂, SO₃H benzene] | Bluish violet. | Bluish red. | Bluish pink. | Red. | Unaltered. | Bordeaux. |
| [structure: OH, NH₂, NO₂ benzene] | do. | [structure: OH, NH₂, NO₂ benzene] | Violet. | Violet precipitate. | Yellowish red. | Red. | Unaltered. | Bordeaux. |
| [structure: OH, NH₂, NO₂, CH₃ benzene] | do. | [structure: OH, NH₂, NO₂, CH₃ benzene] | Blue. | Blue precipitate. | Yellowish red. | Reddish blue. | Unaltered. | Bordeaux. |

| Diazo compound of— | Component. | Diazo compound of— | Reactions of the Na-salt of the dyestuff. | | | Reactions of the copper compound. | | |
|---|---|---|---|---|---|---|---|---|
| | | | Solution in H₂O. | Aqueous solution after addition of NaOH. | Dyeing on cotton. | Solution in H₂O. | Aqueous solution after addition of NaOH. | Dyeing on cotton. |
| 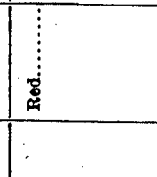 | 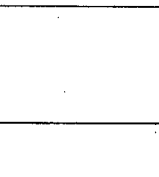 | 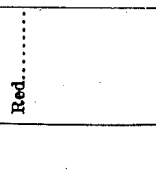 | Red | Bluish red | Pink | Red | Unaltered | Red. |
| 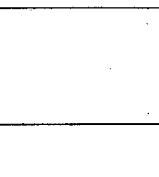 | 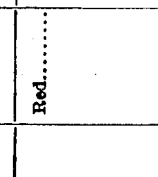 | 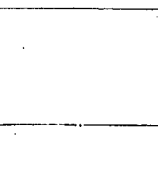 | Red | Orange red | Yellowish pink. | Bluish red | Unaltered | Bordeaux. |
| 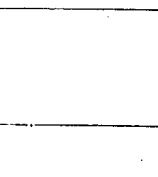 | 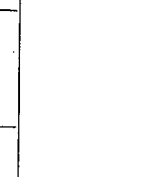 |  | Red | Bluish red | Red | Bluish red | Unaltered | Bluish bordeaux. |

| Diazo compound of— | Component. | Diazo compound of— | Reactions of the Na-salt of the dyestuff. | | | Reactions of the copper compound. | | |
|---|---|---|---|---|---|---|---|---|
| | | | Solution in $H_2O$. | Aqueous solution after addition of NaOH. | Dyeing on cotton. | Solution in $H_2O$. | Aqueous solution after addition of NaOH. | Dyeing on cotton. |
| (OH, NH₂, NO₂-benzene) | (naphthol-sulfonic acid–NH–CO–benzene / –N=N–benzene–SO₃H) | ......... | Bluish red. | Red. | Reddish brown. | Red. | Unaltered. | Bluish red. |
| (OH, NH₂, SO₃H-benzene) | (naphthol-sulfonic acid–NH–CO–benzene / –N=N–benzene–COOH) | ......... | Brownish red. | Brown. | Yellowish red. | Reddish brown. | Unaltered. | Reddish brown. |
| (OH, NH₂-benzene) | (naphthol-sulfonic acid–NH–CO–NH–benzene / –N=N–benzene–SO₃H) | ......... | Bluish red. | Reddish brown. | Yellowish red. | Red. | Unaltered. | Bluish red. |

| Diazo compound of— | Pyrazolone derivative to be further diazotized. | Final component. | Reactions of the Na-salt of the dyestuff. | | | Reactions of the copper compound. | | |
|---|---|---|---|---|---|---|---|---|
| | | | Solution in H₂O. | Aqueous solution after addition of NaOH. | Dyeing on cotton. | Solution in H₂O. | Aqueous solution after addition of NaOH. | Dyeing on cotton. |
| OH–NH₂–SO₃H (benzene) | N=C.CH₃ / CO–CH₃ (phenyl-NH₂) | SO₃H / OH / NHCOC₆H₅ (naphthalene) | Yellowish red. | Reddish yellow. | Salmon red. | Yellowish red. | Unaltered. | Red. |
| OH–NH₂–SO₃H (benzene) | N=C.COOH / CO–CH₃ (phenyl-NH₂) | SO₃H / OH / NH–CO / NH / OH / SO₃H ½ mol. | Red. | Somewhat yellower. | Yellowish red. | Red. | Unaltered. | Red. |

| Formula of the dyestuff. | Reactions of the Na-salt of the dyestuff. | | | Reactions of the copper compound. | | |
|---|---|---|---|---|---|---|
| | Solution in H₂O. | Aqueous solution after addition of NaOH. | Dyeing on cotton. | Solution in H₂O. | Aqueous solution after addition of NaOH. | Dyeing on cotton. |
| [structure] | Brownish red. | Brownish red. | Brownish red. | Brownish red. | Unaltered. | Brown. |
| [structure] | Red. | Red. | Reddish brown. | Brownish red. | Unaltered. | Brown. |
| [structure] | Olive. | Brown. | Reddish brown. | Brown. | Unaltered. | Blackish brown. |
| [structure] | Red. | Brown. | Reddish brown. | Brown. | Unaltered. | Olive brown. |

| Formula of the dyestuff. | Reactions of the Na-salt of the dyestuff. | | | Reactions of the copper compound. | | |
|---|---|---|---|---|---|---|
| | Solution in H₂O. | Aqueous solution after addition of NaOH. | Dyeing on cotton. | Solution in H₂O. | Aqueous solution after addition of NaOH. | Dyeing on cotton. |
| [structure] | Bluish red. | Bluish red. | Violet. | Brownish red. | Unaltered. | Brownish red. |
| [structure] | Reddish violet. | Reddish violet. | Buff blue. | Bluish red. | Unaltered. | Reddish lilac. |
| [structures with +2 mol.] | Reddish blue. | Reddish blue. | Bluish bordeaux. | Bluish red. | Unaltered. | Reddish violet. |
| | Reddish violet. | Reddish violet precipitate. | Blue. | Brown. | Brown precipitate. | Reddish violet. |
| | Bluish violet. | Bluish violet. | Bluish violet. | Reddish violet. | Reddish violet precipitate. | Reddish lilac. |
| [structure] | Violet. | Bluish red. | Violet brown. | Bluish red. | Somewhat bluer. | Reddish violet. |

| Formula of the dyestuff. | Reactions of the Na-salt of the dyestuff. | | | Reactions of the copper compound. | | |
|---|---|---|---|---|---|---|
| | Solution in H₂O. | Aqueous solution after addition of NaOH. | Dyeing on cotton. | Solution in H₂O. | Aqueous solution after addition of NaOH. | Dyeing on cotton. |
| [structure 1] | Pure blue. | Bluish violet. | Blackish blue. | Bluish violet. | Bluish violet precipitate. | Reddish blue. |
| [structure 2] | Bluish red. | Bluish red. | Blue. | Bluish red. | Unaltered. | Blue. |
| [structure 3] | Red. | Yellowish red. | Red. | Red. | Unaltered. | Bordeaux. |
| [structure 4] | Red. | Yellowish red. | Red. | Red. | Red. | Bordeaux. |

| Formula of the dyestuff. | Reactions of the Na-salt of the dyestuff. | | | Reactions of the copper compound. | | |
|---|---|---|---|---|---|---|
| | Solution in H₂O. | Aqueous solution after addition of NaOH. | Dyeing on cotton. | Solution in H₂O. | Aqueous solution after addition of NaOH. | Dyeing on cotton. |
| 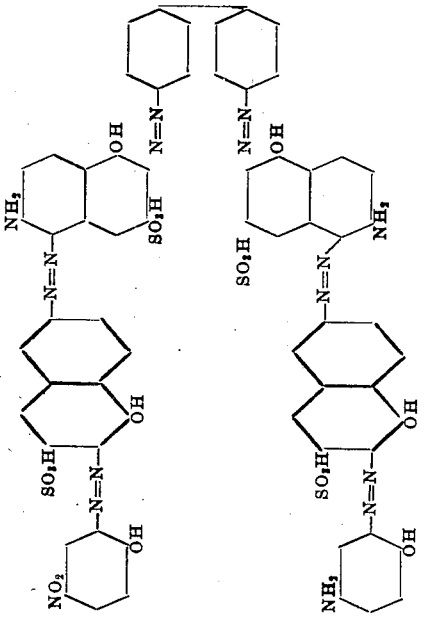 | Blue...... | Bluish violet | Blue...... | Reddish violet. | Unaltered.... | Reddish blue. |
| 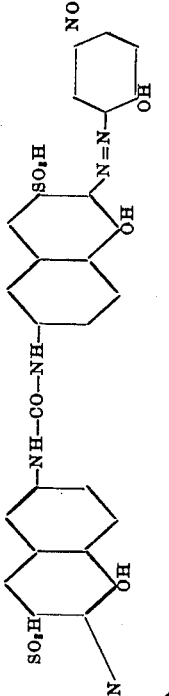 | Blue...... | Bluish violet precipitate. | Brownish violet. | Reddish violet. | Violet precipitate. | Violet. |

| Formula of the dyestuff. | Reactions of the Na-salt of the dyestuff. | | | Reactions of the copper compound. | | |
|---|---|---|---|---|---|---|
| | Solution in H₂O. | Aqueous solution after addition of NaOH. | Dyeing on cotton. | Solution in H₂O. | Aqueous solution after addition of NaOH. | Dyeing on cotton. |
| 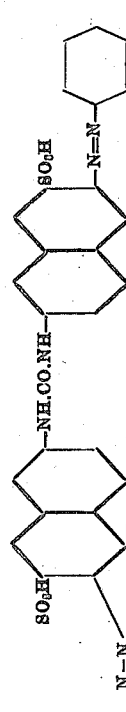 | Bluish violet. | Reddish brown. | Reddish brown. | Bordeaux. | Bordeaux. | Bluish lilac. |
| 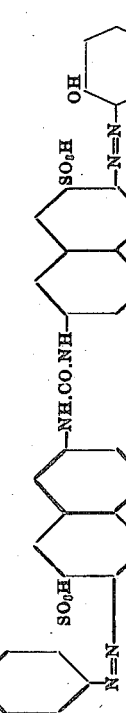 | Blue. | Blue. | Grayish blue. | Bluish violet. | Unaltered. | Reddish blue. |
| 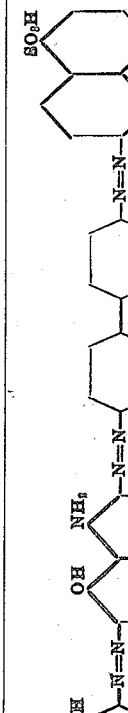 | Blue. | Blue. | Steel-grey. | Blue. | Unaltered. | Bluish grey. |

| Formula of the dyestuff. | Reactions of the Na-salt of the dyestuff. | | | Reactions of the copper compound. | | |
|---|---|---|---|---|---|---|
| | Solution in H₂O. | Aqueous solution after addition of NaOH. | Dyeing on cotton. | Solution in H₂O. | Aqueous solution after addition of NaOH. | Dyeing on cotton. |
| (structure with NO₂, OH, NH₂, OH, SO₃H, N=N groups) | Reddish blue. | Reddish blue. | Grayish blue. | Red. | Unaltered. | Bluish red. |
| (structure with SO₃H, OH, NH₂, N=N groups) | Reddish violet. | Red. | Violet. | Reddish violet. | Unaltered. | Reddish violet. |
| (structure with SO₃H, OH, NH₂, N=N groups) | Reddish violet. | Violet red. | Garnet. | Reddish violet. | Unaltered. | Reddish violet. |

| Formula of the dyestuff. | Reactions of the Na-salt of the dyestuff. | | | Reactions of the copper compound. | | |
|---|---|---|---|---|---|---|
| | Solution in H₂O. | Aqueous solution after addition of NaOH. | Dyeing on cotton. | Solution in H₂O. | Aqueous solution after addition of NaOH. | Dyeing on cotton. |
| 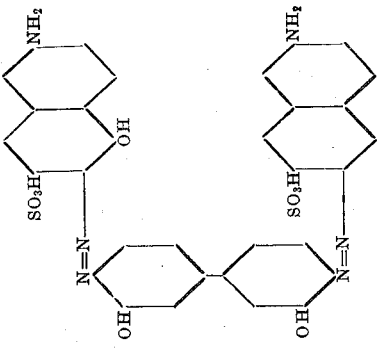 | Reddish violet. | Reddish violet. | Reddish violet. | Violet. | Violet. | Violet. |

27

| Tetrazo compound of— | Component. | Reactions of the Na-salt of the dyestuff. | | | Reactions of the copper compound. | | |
|---|---|---|---|---|---|---|---|
| | | Solution in $H_2O$. | Aqueous solution after addition of NaOH | Dyeing on cotton. | Solution in $H_2O$. | Aqueous solution after addition of NaOH. | Dyeing on cotton. |
| [structure: NH₂/OH phenyl-CH₂-phenyl NH₂/OH] | [structure: SO₃H naphthyl NH₂/OH] 2 mol. | Red | Dull bordeaux | Red | Bluish red | Unaltered | Reddish violet. |
| [structure: SO₃H/NH₂/OH phenyl-NH-CO-CO-NH-phenyl SO₃H/NH₂/OH] | [structure: SO₃H naphthyl -NH-CO- phenyl NH₂/OH] 2 mol. | Violet | Wine red | Lilac | Bluish red | Unaltered | Violet. |
| ........do............ | [structure: SO₃H naphthyl -NH-CO-NH- naphthyl SO₃H/OH with SO₃H/OH] 1 mol. | Bluish violet | Bluish red | Lilac | Bluish red | Unaltered | Violet. |
| [structure: OH/NH/NH₂ phenyl-CO-CO-phenyl NH/NH₂/OH] | [structure: SO₃H naphthyl NH₂/OH] 2 mol. | Red | Dull red | Red | Reddish violet | Unaltered | Violet. |

The new copper compounds are not only suitable for dyeing cotton, wool, silk, mixed goods, straw, wood, paper, leather, etc., according to the method used for dyestuffs dyeing without mordants, but can also be employed for printing purposes and for the production of lakes fast to light.

If the copper compound possesses a further diazotable amido-group, it can after dyeing be further diazotized on the fiber and combined with the usual developers (betanaphthol, toluylenediamin, etc.). It is for instance the case when the dyestuff derives from 2:5:7-aminonaphtholsulfonic acid or from one of its derivates containing a diazotable amino-group in the exonucleic benzene nucleus.

If the dyestuff employed for the manufacture of the copper compound, owing to the presence of a hydroxyl group whose ortho-position is not occupied, is still able to combine with diazocompounds, the dyeing obtained with the copper compound can be developed on the fiber with the usually employed diazo-compounds as for instance paranitrodiazobenzene, the diazoderivative of dianisidin, etc. It is for instance the case when in the dyestuff employed as parent material a derivative of 2:5:7-aminonaphtholsulfonic acid containing two rests of 2:5:7-aminonaphtholsulfonic acid in its molecule is coupled only with one molecule diazocompound.

What we claim is:

1. The herein described process for the manufacture of new copper compounds of orthooxyazodyestuffs, consisting in acting with a copper compound on a solution of a substantive cotton orthooxyazodyestuff containing a 2:5:7-aminonaphtholsulfonic component.

2. The herein described new copper compounds of substantive cotton orthooxyazo-dye-stuffs, from which the copper cannot be precipitated with sodium carbonate, soda lye and ammonia and which constitute extensively colored powders dissolving in concentrated sulfuric acid to strongly colored solutions and in water to colored solutions which remain substantially unchanged on addition of sodium carbonate or of soda lye and from which cotton is dyed according to the methods used for the known substantive cotton dyestuffs, various tints fast to light, washing and alkali.

In witness whereof we have hereunto signed our names this 6th day of October, 1915, in the presence of two subscribing witnesses.

EUGEN ANDERWERT.
Dr. HERMANN FRITZSCHE.
Dr. HEINRICH SCHOBEL.

Witnesses:
ARNOLD ZUBER,
AMAND RITTEY.